United States Patent Office

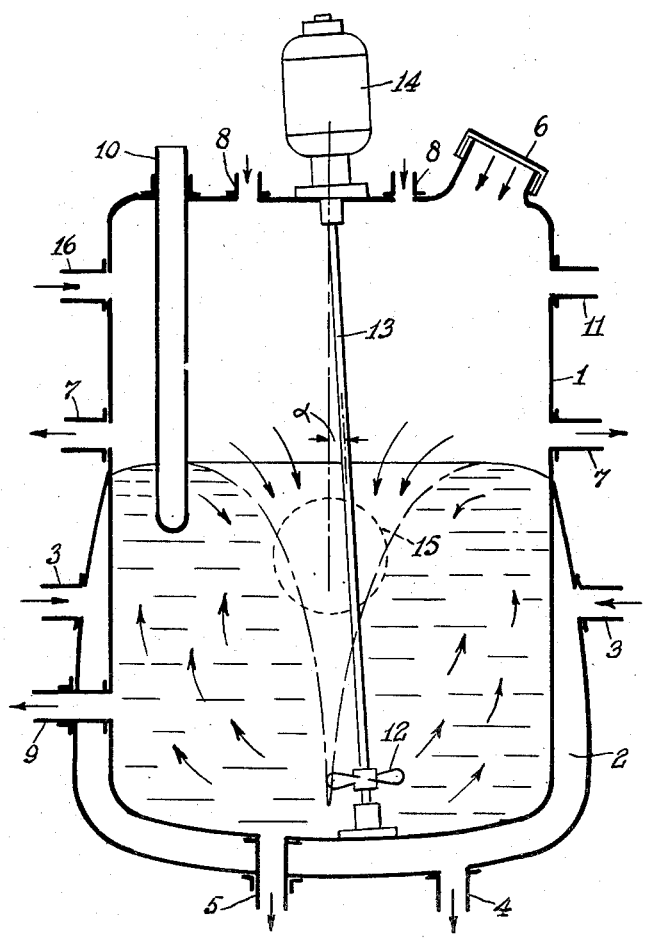

2,703,304
Patented Mar. 1, 1955

2,703,304

FOAMLESS STIRRING AND/OR HOMOGENIZING PROCESS AND APPARATUS THEREFOR

Salvatore Paladino, Rome, Italy, assignor of fifty per cent to Fondazione Emanuele Paternò, Rome, Italy, a company of Italy Application October 11, 1949, Serial No. 120,718

Claims priority, application Italy June 7, 1949

7 Claims. (Cl. 195—107)

The invention relates to a process for the simultaneous or separate stirring and/or homogenising, with no foam, of systems: gas-liquid or liquid-liquid, liable to be applied in chemical processes in general. Subject matter of the invention is also the apparatus which allows the practical embodiment of said process.

The main purpose of the invention is to allow, simultaneously or separately:

(a) The complete stirring, with no dead-zones, of a fluid mass;

(b) The stirring, as above and the homogenising, either of a gas within a liquid or of a liquid within another liquid having a different density;

(c) A stirring or a homogenising with continuously prevented formation of foam, even when operating with strongly foaming compounds having different densities.

By the term "homogenising" we mean also the emulsifying operations.

Well known are the draw-backs continuously complained about, in the practical application of the three operations abovementioned, to such an extent as to be compelled to have recourse to more or less successful contrivances with a high waste of power, consumption of compounds and only a low output in the production.

Often the usual anti-foaming compounds may not be used, on account of the reactions engendered with the compounds to be homogenised. As a rule presently, the homogenisation of a gas within a liquid is carried into effect by injecting the gas into the liquid mass, taken in great bulk, and maintaining the latter in motion by the use of stirrers.

Under such conditions, the gas remains in contact with the liquid, during a very short while, viz., during the time strictly necessary to flow through the liquid mass; and has practically no time to react with it, so that the gas is set free again in nearly intact state. Thence derives the necessity to operate with enormous quantities of gas, which involves the provision of bulky and costly plants in the case of some very important fermentative processes where the gas (air) must be sterile.

The homogenising is nearly all, accompanied by formation of foam, which according to the actual case, might become more or less detrimental for the reaction, by lowering the output thereof. In some processes it is definitely noxious, as it excludes the fermentation and wastes enormous quantities of products. The present state of art, following an extensive research-work, has applied anti-foaming compounds, which do not abolish completely the losses due to dragging (in the best cases we have a loss of 15–17%) whilst in many cases they cannot be used on account of their chemical incompatibility with the substances under treatment.

All the above draw-backs are obviated by the invention, which allows to carry into effect, contemporaneously or separately, the stirring and/or the homogenising with no foam formed.

The principle which is the base of the invention is that of the formation of a permanent vortex within the liquid; the extremity of the said vortex is periodically cut off by a member in rotary movement. A vortex, no matter how generated, within the liquid, may always be regarded as a funnel or cone with its base turned upward and its apex downward, filled with the gas contained above the liquid mass. In the case: liquid/liquid (emulsifying process) the liquid of lower density will constitute the internal wall of the funnel, sliding along the vortex for being cut off by said member.

If the vertex of the funnel, e. g. gaseous, is periodically cut off by a member in rotary motion, the gas contained in it will be led into the liquid, so that said gas, after having been uniformly distributed by the stirrer within the liquid and brought about the homogensing effect will rise above the liquid for being dragged once more in it. The depression brought about by the vortex at the vertex of the funnel, will generate a circulation of gas moving from the side walls of the container toward its center at the base of the vortex, to be hereafter sucked toward the lower extremity of this latter.

The quantity of gas injected in the liquid is a function of the speed at which the vertex of the funnel is being cut off, and is therefore adjustable at will. According to the invention, the quantity of gas to be used is that strictly necessary for the chemical process to be engendered, and, in case of fermentative reactions, the quantity of air is that strictly necessary for the fermentative process. The introduction of said quantity may be effected in one time, if permitted by the bulk of the container or the nature of the reaction; also or at intervals, after previous extraction of the gas deriving from the reaction or from the fermentative process.

On the other hand, the formation of the vortex and its periodical rupture by means of the said member provoke the continuous stirring of the liquid and its rotary movement around the walls of the container, in such a way that periodically, it should come to constitute the walls of the cone of the vortex and cut off by the member provided for the rupture. This way, the whole liquid mass is compelled to take an active part in the process, ensuring in the same time, its perfect homogenising with the gas accumulated thereabove.

The formation of the vortex, as stated above, brings about a depression at its vertex and consequently, a suction toward the latter, of substances or particular layers of the substances which may be floating on the surface of the liquid (chemical compounds or foams).

Said member, when cutting off the vertex of the cone, drags into the liquid and distributes uniformly therein, all the chemical compounds or foams, after having broken the equilibrium for the latter, with the consequent introduction into the liquid of a new quantity of gas.

By using the process according to the invention, particularly on the reproductive medium for the facture of antibiotic compounds (penicillin, streptomycin, etc.) besides the practical advantages, such as the reduction of the bulk of installations for the introduction of sterilized air, speeding up of the production, etc. at the end of the fermentative phase we had a novel type of filiform mycelium with reproductive spores, which make possible a continuous operative cycle.

The same type of mycelium rather facilitates the filtering operations and excluded the losses unavoidable with the systems used theretofore, on account of the formation of thick layers of mycelium which obstructed the filter-presses, to such an extent as to hinder the utilization of the liquid submitted to the operation.

The process, subject-matter of the invention assumes a particular importance in all fermentative processes, also in those e. g. which are involved in brewing, as well as in all other processes in which profit is drawn from aerobic bacteria, as in the clearing of sewerage waters.

The apparatus for the embodiment of this process, may consist, simply of a container at the bottom of which an element is set in rotation around an axis slightly offset in respect to the vertical. The assembly is arranged and adjusted in such a way, that following the rotary motion of said element a vortex be formed the apex or vertex of which be located at the bottom of the container, so as to be cut off by the same element giving origin to the formation of the vortex.

A preferred form of practical embodiment is illustrated by way of example, and in a schematical way, in the annexed drawing, which shows an axial section of the apparatus.

With reference to the drawing, at 1 is shown a sealed container of cylindrical shape provided with a jacket 2, for the heating or the cooling thereof inlets 3 and outlets 4 for the heating or cooling fluid and bottom discharge outflow 5 and charing hole 6. Said container contains the liquid to be caused to react, which reaches a certain level in it. Provision is made for outlets 7 for both gas and the treated liquid as well as inlets 8 for both gas and the liquid to be homogenised with the liquid stored in the container.

A tap 9 allows the removal of samples of liquid during the reaction for the necessary controls; in 10 are located the bulbs for the control and recording of temperature apparatus serving for the control of pressure are fitted on sleeve 11.

Container 1 is fitted at its bottom, with a propeller 12 having two or more blades, inclined at a given angle α (preferably of a few degrees) in respect of the vertical axis of the container, and set in rotation through shaft 13, by means of motor 14, at variable speed, and with left or right-hand rotation, according to the requirements of the process.

The container is also provided with glass-covered inspection holes 15 through which, with the auxiliary of suitable illumination, one has the possibility to follow the liquid during the process. The joint 16 allows the introduction of steam for the sterilization of the container, provided this be necessary.

If the air-screw is set in rotation at a lower speed, the vortex reaches a lower depth and will not be cut off by the blades of the propeller. In similar cases there is only stirring but nonhomogenisation.

It is obvious that for specific purposes, the process might be realised in free contact with the atmosphere. In similar way, the formation of the vortex may be ensured by other means, which, might be also separated from those effecting the rupture of the said vortex.

I claim:

1. A process for stirring and intimately mixing a fluid with a liquid without the formation of foam, which comprises establishing a body of the liquid, forming in the body of liquid a continuously rotating vertical vortex having a downwardly extending apex, introducing the fluid to be mixed with said liquid into said vortex, and intermittently but rapidly cutting off the downwardly extending apex of the vortex, whereby the fluid in the vortex flows into the portion of the liquid body adjacent the walls of the vortex after each cutting off of the vortex apex and is intimately mixed therewith without foam production.

2. A process as defined in claim 1, wherein said periodic cutting off of the apex of the vortex is effected only when the vortex rotates at a predetermined speed and the apex of the vortex reaches a predetermined depth in the body of liquid.

3. A process as defined in claim 1, wherein the fluid introduced into the body of liquid is a gas.

4. A process as defined in claim 1, wherein the fluid introduced into the body of liquid is a liquid having a density which is less than that of the said body of liquid.

5. A process as defined in claim 1, wherein the body of liquid is the reproductive medium for antibiotic substances and the fluid introduced into said body of liquid is sterile air, whereby at the end of the production of said antibiotic substance a mycelium is obtained in a foliform state with reproductive spores permitting the continuous cycle in the production of the antibiotic substance.

6. A process as defined in claim 5, wherein the quantity of air introduced is limited to that necessary for the fermentative process.

7. An apparatus for effecting stirring and intimate mixing of a liquid and a fluid without the production of foam which comprises, in combination, a container having a concave bottom and provided with a jacket for a heat transfer medium, a rotatably mounted member disposed in said container adapted to rotate at controlled speeds about an axis inclined a few degrees with respect to the vertical axis of the container, the upper end of the axis of rotation of said member coinciding with the upper end of the vertical axis of the container, drive means for said rotatably mounted member, a charging port at the top of said container, a discharge port at the bottom of said container, inlet means for the fluid to be mixed with the liquid contained in the container, and side outlet ports establishing a predetermined level of liquid in said container.

References Cited in the file of this patent

UNITED STATES PATENTS

| | | |
|---|---|---|
| 1,423,830 | Christensen | July 25, 1922 |
| 1,598,185 | Willard | Aug. 31, 1926 |
| 1,974,501 | Marty | Sept. 25, 1934 |
| 2,184,085 | Ruetz | Dec. 19, 1939 |
| 2,192,199 | Myers | Mar. 5, 1940 |
| 2,321,453 | Boileau | June 8, 1943 |
| 2,522,947 | Hatch et al. | Sept. 19, 1950 |
| 2,524,437 | Garnatz | Oct. 3, 1950 |
| 2,552,057 | Paik | May 8, 1951 |
| 2,557,564 | Renner | June 19, 1951 |